(12) United States Patent
Axelrod et al.

(10) Patent No.: US 12,167,718 B2
(45) Date of Patent: Dec. 17, 2024

(54) INTERACTIVE PET FEEDER

(71) Applicant: T.F.H. PUBLICATIONS, INC., Neptune City, NJ (US)

(72) Inventors: Glen S. Axelrod, Colts Neck, NJ (US); Ajay Gajria, Monmouth Junction, NJ (US)

(73) Assignee: T.F.H. PUBLICATIONS, INC., Neptune City, NJ (US)

( * ) Notice: Subject to any disclaimer, the term of this patent is extended or adjusted under 35 U.S.C. 154(b) by 0 days.

(21) Appl. No.: 18/170,227

(22) Filed: Feb. 16, 2023

(65) Prior Publication Data

US 2023/0255177 A1    Aug. 17, 2023

Related U.S. Application Data

(60) Provisional application No. 63/268,104, filed on Feb. 16, 2022.

(51) Int. Cl.
*A01K 5/01* (2006.01)
*A01K 15/02* (2006.01)

(52) U.S. Cl.
CPC .......... *A01K 5/0114* (2013.01); *A01K 15/025* (2013.01)

(58) Field of Classification Search
CPC ... A01K 5/0114; A01K 15/025; A01K 15/026
USPC ...................................... 119/707, 709, 51.01
See application file for complete search history.

(56) References Cited

U.S. PATENT DOCUMENTS

| | | | | |
|---|---|---|---|---|
| 4,823,738 A | * | 4/1989 | Gold | A01K 5/0114 119/51.01 |
| 5,722,348 A | * | 3/1998 | Phillips | A01K 1/03 119/421 |
| 6,073,581 A | * | 6/2000 | Wang | A01K 5/0114 119/51.01 |
| 6,098,571 A | * | 8/2000 | Axelrod | A01K 5/0114 119/710 |
| 8,230,808 B2 | * | 7/2012 | Lai | A01K 5/0114 119/61.5 |
| 2006/0060153 A1 | | 3/2006 | Washington et al. | |
| 2007/0068464 A1 | * | 3/2007 | Smith | A01K 15/025 119/709 |
| 2011/0083608 A1 | * | 4/2011 | Markham | A01K 5/0114 119/51.01 |
| 2011/0226187 A1 | | 9/2011 | Bertsch | |
| 2011/0297093 A1 | | 12/2011 | Lai | |

(Continued)

FOREIGN PATENT DOCUMENTS

| | | | | |
|---|---|---|---|---|
| CN | 108450347 A | * | 8/2018 | .......... A01K 5/0114 |
| DE | 202008011742 | | 1/2009 | |
| DE | 202012101322 U1 | * | 7/2012 | .......... A01K 39/012 |

OTHER PUBLICATIONS

Merged translation of DE202012101322 (Year: 2012).*

(Continued)

*Primary Examiner* — Morgan T Jordan
(74) *Attorney, Agent, or Firm* — Grossman, Tucker, Perreault & Pfleger, PLLC

(57) ABSTRACT

An interactive pet feeder where the rate of release of an edible treat for the animal can be regulated by the user. The interactive pet feeder may therefore be configured to release an edible treat depending upon the level of engagement that the pet maintains with the feeder and adjusted by the user to maintain the animal's interest.

20 Claims, 4 Drawing Sheets

(56) References Cited

U.S. PATENT DOCUMENTS

| | | | |
|---|---|---|---|
| 2013/0035785 A1 | 2/2013 | Macvittie et al. | |
| 2015/0342145 A1* | 12/2015 | Christianson | H04W 4/80 |
| | | | 119/51.01 |
| 2017/0127647 A1 | 5/2017 | Owens, III | |
| 2019/0059322 A1 | 2/2019 | Xu | |
| 2019/0216049 A1* | 7/2019 | Yuan | A01K 5/02 |
| 2020/0137981 A1 | 5/2020 | Hamill et al. | |
| 2020/0367469 A1 | 11/2020 | Zhu | |
| 2022/0279753 A1* | 9/2022 | Iannella | A01K 5/0114 |

OTHER PUBLICATIONS

Merged translation of CN_108450347 (Year: 2018).*
Chewy, JW Pet Treat Tower Treat Dispensing Dog Toy, Online Catalog, 2021, retrieved May 22, 2023 from URL: https://web.archive.org/web/20210204121052/https://www.chewy.com/jw-pet-treat-tower-treat-dispensing-dp/201803.
International Search Report and Written Opinion from corresponding PCT Appln. No. PCT/US2023/062727, dated Jul. 20, 2023.
TRIXIE Roly Poly Dog Treat Dispenser sold on Amazon, downloaded Feb. 16, 2023 from: https://www.amazon.com/TRIXIE-Roly-Poly-Snack-Plastic/dp/B07VNCJXV5.
TRIXIE Roly Poly Snack Egg sold on Vivapets, downloaded Feb. 16, 2023 from: https://shop.vivapets.com/us/trixie-roly-poly-snack-egg-for-snacks-8-cm.

* cited by examiner

INTERACTIVE PET FEEDER

CROSS-REFERENCE TO RELATED APPLICATIONS

This application is a non-provisional of and claims priority to U.S. Provisional Application No. 63/268,104 filed Feb. 16, 2022, the entire content of which is incorporated herein by reference.

FIELD

The present disclosure is directed at an interactive pet feeder where the rate of release of an edible treat for the animal can be regulated by the user. The interactive pet feeder may therefore be configured to release an edible treat depending upon the level of engagement that the pet maintains with the feeder and adjusted by the user to maintain the animal's interest.

BACKGROUND

Various efforts have been made to provide an interactive pet feeder device that will selectively release an edible treat as triggered by some physical activity by the animal engaged with the feeder device. The goal therefore has been to promote physical activity of the pet with the feeder and to reward the animal after a selected period, so that the interest in the device is maintained.

One example of a pet exercise and entertainment device is identified in U.S. Publication No. 2020/0137981 entitled Pet Exercise and Entertainment Device. Other examples include the products sold as the Roly Poly Snack Egg and the Roly Poly Dog Treat Dispenser marketed by Trixie which identify themselves as providing the ability to regulate the output of treats.

SUMMARY

In at least one embodiment, a pet feeder comprising a top portion to contain one or a plurality of edible pet treats; one or a plurality of rotatable plates, each including one or a plurality of holes; a landing plate having one or a plurality of openings to dispense the one or plurality of treats from the pet feeder; a bottom portion; wherein the one or plurality of rotatable plates are mechanically engaged to one another, and rotatable relative to one another and the landing plate; wherein the top portion is mechanically engaged with the bottom portion; wherein the pet feeder has a central axis; and wherein the one or plurality of rotatable plates each have a downwardly sloping surface angled to promote movement of the one or plurality of edible treats around the central axis and towards the one or plurality of holes.

In at least one embodiment, the sloping surface is provided by an annular ring disposed around the central axis.

In at least one embodiment, the sloping surface extends around the annular ring in a wave pattern.

In at least one embodiment, the wave pattern has at least four inflection regions comprising at least two peak inflection regions and at least two trough inflection regions.

In at least one embodiment, the sloping surface slopes downward from each of the at least two peak inflection regions towards each of the at least two trough inflection regions.

In at least one embodiment, the one or plurality of holes are disposed at the at least two trough inflection regions.

In at least one embodiment, the sloping surface is angled at an acute angle relative to the central axis to promote movement of the one or plurality of edible treats towards the central axis.

In at least one embodiment, the bottom portion includes one or a plurality of protruding flanges.

In at least one embodiment, the bottom portion includes a rounded portion to support the pet feeder on a support surface.

In at least one embodiment, the top portion, one or plurality of rotatable plates, landing plate, and bottom portion, are made of thermoplastic.

In at least one embodiment, the top portion is made of polycarbonate.

In at least one embodiment, the one or plurality of rotatable plates, landing plate and bottom portion are made of polypropylene.

In at least one embodiment, the one or plurality of rotatable plates comprises 1-6 plates.

In at least one embodiment, the one or plurality of rotatable plates each include 1-6 holes.

In at least one embodiment, a pet feeder comprising a top portion to contain one or a plurality of edible pet treats; a plurality of rotatable plates, each including one or a plurality of holes, wherein the rotatable plates each include 1-6 holes; a landing plate having 1-5 openings to dispense the one or plurality of treats from the pet feeder; a bottom portion including a rounded portion to support the pet feeder on a support surface; wherein the plurality of rotatable plates are mechanically engaged to one another, and rotatable relative to one another and the landing plate; wherein the top portion is mechanically engaged to the bottom portion; wherein the pet feeder has a central axis; and wherein the plurality of rotatable plates each have a sloping surface angled to promote movement of the one or plurality of edible treats around the central axis and towards the one or plurality of holes.

In at least one embodiment, a method of using the pet feeder as disclosed.

DETAILED DESCRIPTION

Figure 1:
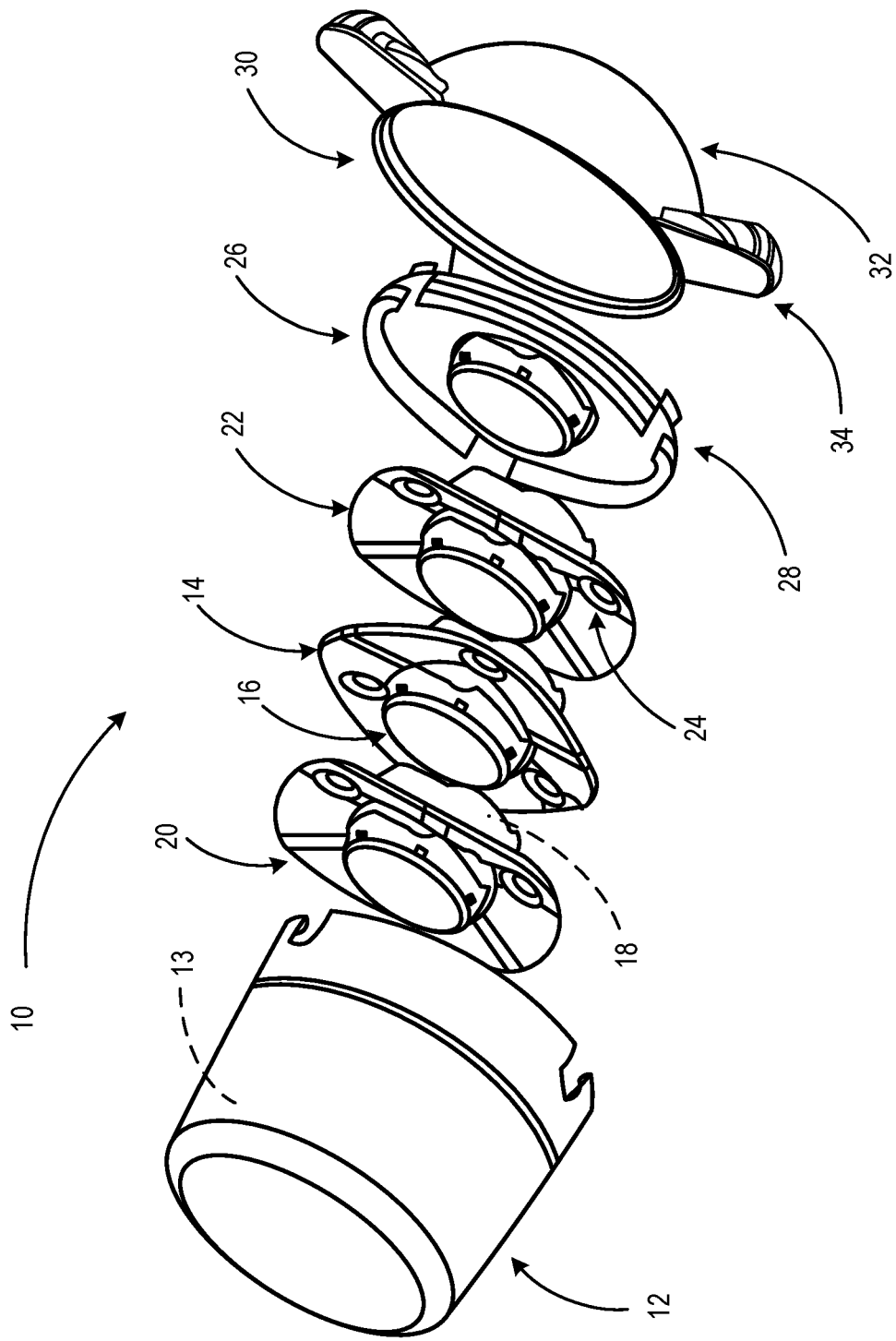
FIG. 1 is a perspective cut-away (exploded) view of a preferred interactive pet feeder.

FIG. 1 provides a perspective cut-away (exploded) view of a preferred interactive pet feeder herein, prior to assembly. As illustrated the interactive pet feeder device 10 includes a (cylindrical cap) top portion 12 in which the user may insert a plurality of pet treats. In such regards, the top portion 12 provides internal cavity/storage container 13 for the let treats. The top portion 12 of the device 10 is also configured to cover and contain one or a plurality of plates 14, 20 and 22 that can be mechanically and rotatably engaged to one another. Reference to a plurality of plates should be understood as two or more plates. In FIG. 1, the preferred interactive pet feeder 10 is illustrated as having three plates, 14, 20 and 22.

Representative plate 14 preferably includes a central, circular, protruding portion 16 (i.e. protruding towards the top portion 12), which may also be referred to as a hub. Protruding portion 16 is configured to fit within and rotationally engage within a central, circular opening 18, i.e. a recess/cavity, on the lower portion of an upper plate 20, which may also be referred to as a top portion/hub receptacle. When two plates are present, such as plates 14 and 20, they may therefore preferably have a mechanical friction fit and are rotatable with respect to one another, as more fully described herein. It may therefore be appreciated that plate 22 may also be rotatably engaged with plate 14.

Figure 2:
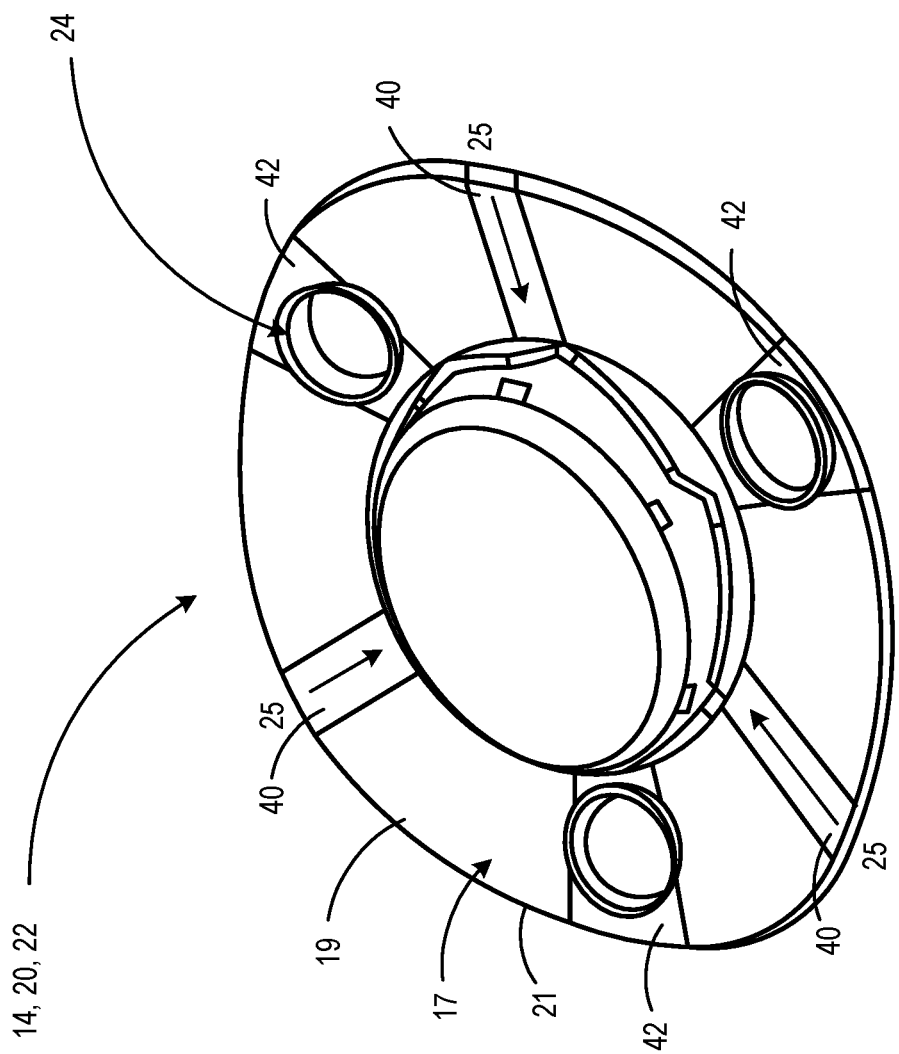
FIG. 2 illustrates one of the preferred rotatable plates of the pet feeder.
Figure 3:
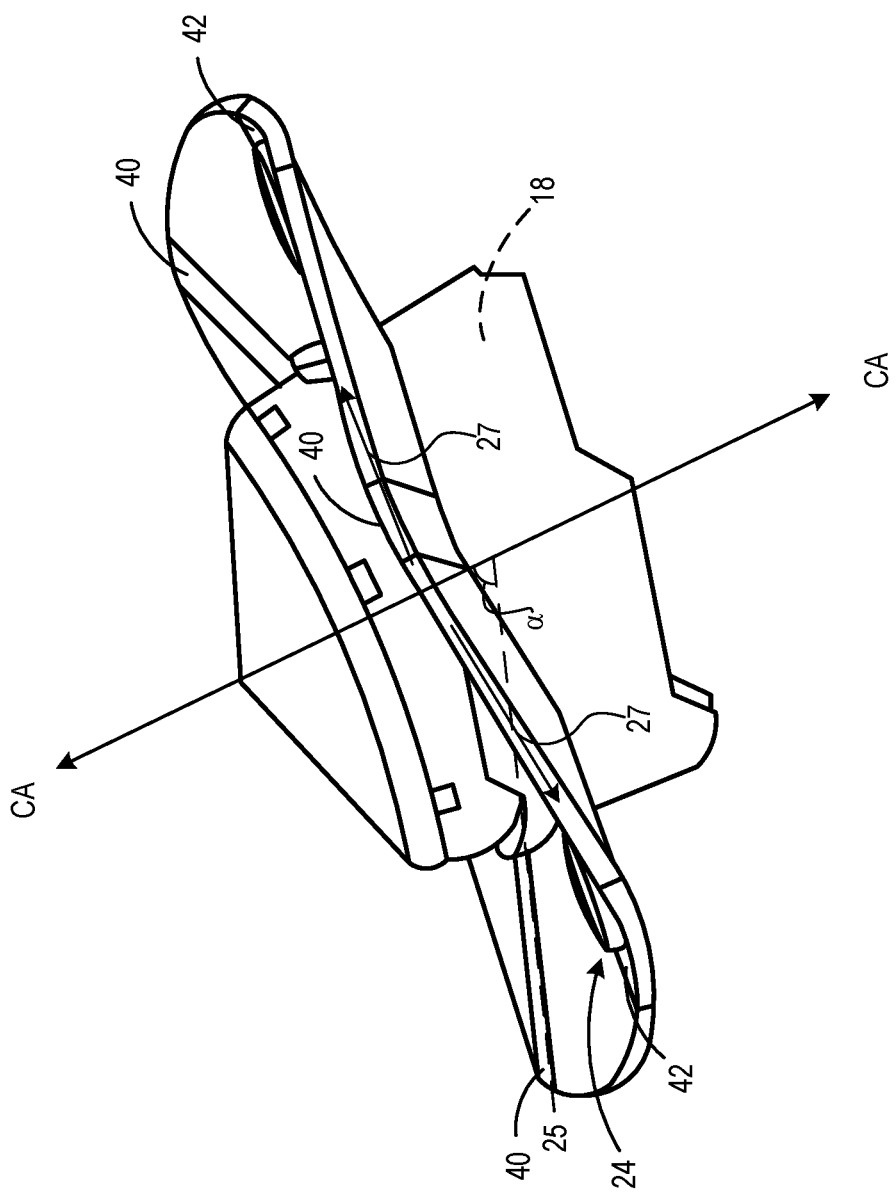
FIG. 3 is another view of one of the preferred rotatable plates, identifying some of the preferred features of the downwardly sloping rotatable plate surface.

Referring to FIGS. 2 and 3, the plates 14, 20 and 22 each have an annular ring 17 which surrounds the hub/protruding portion 16 and the hub receptacle/opening 18. As can also be seen, the plurality of plates 14, 20 and 22 are preferably contoured, meaning that annular ring 17 of the plates 14, 20 and 22 provide a sloped (annular) surface 19 that is downwardly sloped when the interactive pet feeder 10 is vertical, i.e. with the central axis CA perpendicular (at a right angle or) 90° to a horizontal plane whereby the top portion 12 is directly above the bottom portion 30.

Attention is directed to FIG. 2 which shows one of the plates 14, 20 or 22 in perspective view. As can be seen, the surface 19 of the plates is preferably sloped downwardly towards a central axis CA of the device 10 (see FIG. 3) as shown by superimposed arrows 25 which sloping surface provides a funnel to funnel treats to the one or a plurality of holes 24. The treats are then passable through the one or plurality of holes 24 towards or onto a landing plate 26 described in further detail below. More particularly, for the 360 degrees around the hub/protruding portion 16, the surface 19 is sloped downwardly from an outer perimeter rim 21 of the annular ring 17 to the hub/protruding portion 16. The holes 24 then allow the treat to fall to the next lower plate, or the landing plate 26, and then ultimately the treats may exit the device 10 as discussed more fully herein.

With respect to the central axis CA, the slope of the surface 19 at 25 is such that it is downwardly sloped (concave) towards the central axis CA. In other words, extending the downwardly sloping arrow 25 as illustrated in FIG. 3 is such that it will intersect with the central axis CA and form an acute angle α that preferably has a value in the range of 60° to 80°.

As also shown in FIG. 3, the surface 19 of the plurality of plates 14, 20 and 22 is additionally configured in what may be described as a wave pattern (the surface 19 of the plates rising and falling) and there is an additional sloping surface as shown by arrows 27 that would urge an edible treat to also roll in the direction of arrows 27 towards the one or more holes 24. From such, it may be understood that as surface 19 extends circumferentially around the hub/protruding portion 16 and the central axis CA, the acute angle α is not constant, but rather changes. More particularly, the surface 19 may be a described as having a sine wave pattern, or sinusoidal wave pattern. As shown, the wave pattern of surface 19 has six transition (inflection) regions, which comprise three high (peak) inflection regions 40 and three low (trough) inflection regions 42, with the inflection regions equally spaced circumferentially around the hub/protruding portion 16 and the central axis CA at approximately 60° (e.g. plus (+) or minus (−) 5° from 60°) from one another in alternating fashion. It should be understood that surface 19 slopes upwards towards the high inflection regions 40 and downwards towards the low inflection regions 42, with the holes 24 disposed in the low inflection regions 42. Further, the acute angle α should be understood as being greater at the low inflection regions 40, i.e. more towards 80° and surface 19 less sloped relative to central axis CA, than at the high inflection regions 42, where the acute angle α is more towards 60° and surface 19 more sloped relative to central axis CA. It should also be understood that the pet feeder device 10 may have more or less inflection regions 40, 42, particular an even number of inflection regions 40, 42 from four to twelve equally divided between high inflection regions 40 and low inflection regions 42.

Accordingly, and preferably, the surface 19 of the plurality of plates 14, 20 and 22 therefore includes a sloping surface 19 that is downwardly inclined towards a central axis CA of the device 10 as well as a sloping surface 19 that promotes an edible treat to move circumferentially around the central axis CA as well as towards the one or plurality of holes 24, under the influence of gravity. This combination of slopes in surface 19 ensures that the edible pet treats that are charged into the device 10 more reliably travel towards the one or plurality of holes 24 and ultimately downwardly in the device 10 when engaged and tilted by the animal, and the edible pet treats (e.g. kibble) do not become lodged or immobilized on any one plate surface.

As may therefore be appreciated, the user (e.g. pet owner) can selectively rotate plates 14, 20 and 22 relative to one another, as desired, to a selected position, which in turn will regulate the passage of treats that are charged into the top portion 12. For example, the one or plurality of holes 24 on the plates 14, 20 and 22 may be configured to align with one another, in which case a treat that is loaded in the device 10 within top portion 12 will tend to fall more rapidly and downward in the device 10, when engaged by the pet, as described more fully below. Alternatively, if the user elects to rotate plates 14, 20 and 22 such that the one or plurality of holes 24 are misaligned or not aligned with one another, the pathway for the edible treat becomes relatively more tortuous and the device 10 may need to be more repeatedly tilted by the animal to ensure release of the treat.

It should also be noted that the plates 14, 20 and 22 may be configured to be freely rotating, meaning that they may randomly rotate and assume a particular position relative to one another. In addition, the holes 24 may be made of varying size, and the plates 14, 20 and 22 may be configured such that the holes 24 may be adjustable in size, with the size of the hole openings set by the user. Moreover, it is contemplated that the plates 14, 20 and 22 are such that they may therefore freely rotate, or include a mechanical catch so that they are prevented from any further free rotation.

In such regard, the level of physical interaction of the device 10 with the animal, to release a treat, can be regulated by the user. Moreover, the number of holes per plate can vary from 1 hole per plate, 2 holes per plate, 3 holes per plate, 4 holes per plate, 5 holes per plate, or 6 holes per plate. The number of holes per plate can also vary between plates, or be the same number. For example, one plate may have one hole, another plate can have two holes, and a third plate can have three holes. It should also be appreciated the while preferably FIG. 1 illustrates that in one preferred embodiment, a plurality of holes 24 can be set at three (3) per plate, the number of holes per plate, may, as noted above, vary from 1 hole per plate to up to 6 holes per plate.

The interactive pet feeder 10 also includes what may be termed a rotatable landing plate 26, where the treats that are charged within top portion 12 can ultimately collect and exit the device at one or a plurality of openings 28 to dispense the treats from the pet feeder 10. For example, the landing plate may preferably have 1-5 openings. This too can regulate the rate of release of the treat.

Accordingly, the interactive pet feeder herein may utilize one rotatable plate 22 containing one or a plurality of holes 24 that is rotatably engaged to the landing plate 26, where the landing plate has one or a plurality of openings 28. Depending then upon the alignment of the one or plurality of holes 24 on plate 22 in relationship to the one or plurality of openings 28 in the landing plate 26, one may again regulate the rate of delivery and release of the treat to the animal.

Expanding on the above, the landing plate 26 is therefore, preferably, rotatably engaged to the upper rotatable plate 22 and also engaged to the bottom portion 30. The engagement of the rotatable plate to the bottom portion may or may not be rotatable. Rotation of the landing plate 26 may therefore be employed by the user to selectively close the one or plurality of openings 28 on the landing plate 26. In addition, the bottom portion 30 preferably has a rounded portion 32 which rests or otherwise supports pet feed device 10 on a planar (e.g. floor, table) support surface. In addition, the bottom portion 30 preferably includes one or a plurality of protruding flanges 34. The flanges preferably protrude 35.0 mm to 45.0 mm. The flanges, which protrude from the device, facilitate engagement with the animal, as the pet may, e.g., press down on any one of the flanges, which will then tilt the device and promote release of a pet treat from the openings 28 in the landing plate 26.

The interactive pet feeder herein is preferably constructed of thermoplastic material. Such includes, but is not limited to polyethylene, polypropylene, polystyrene, acrylonitrile-butadiene-styrene resins, polycarbonate, polysulfone, polyesters such as poly(ethylene terephthalate) or poly(butylene terephthalate), polystyrene-polyphenylene oxide resin. The various components of the pet feeder, such as the top portion 12, plates 14, 20 and 22, landing plate 26 and bottom portion 30 may be preferably formed by injection molding. In addition, the thermoplastic material may include various selected additives such as inorganic fillers, flavorings or attractants, to separately engage the pet's interest in the interactive pet feeder. The ingredients are preferably organic ingredients, meaning that they are materials from animal or plant origin produced according to organic standards. The components of the pet feeder may also be made of bioplastics, which is reference to plastics that originate from a renewable resource, are biodegradable, or both. An example of a bioplastic may therefore include starch. In one particularly preferred embodiment, the top portion 12 is made of polycarbonate, and the plates 14, 20 and 22, as well as the landing plate 26 and bottom portion 30 are made of polypropylene.

In addition, preferably, the individual components of the interactive pet feeder can be selected to provide an overall weight that provides an appropriate weight and balance for use with an animal. For example, the top portion 12 is preferably 75.0 grams to 125 grams, plates 14, 20 and 22 are preferably 15.0 grams to 35.0 grams, landing plate 30 is preferably 20.0 grams to 30.0 grams, and bottom portion 30 is preferably 50.0 grams to 70.0 grams. The overall weight of the interactive pet feeder preferably falls in the range of 200.0 grams to 300.0 grams, even more preferably in the range of 250.0 grams to 270.0 grams. The overall height of the interactive feeder also preferably falls in the range of 125.0 mm to 175.0 mm, more preferably 145.0 mm to 155.0 mm.

Figure 4:
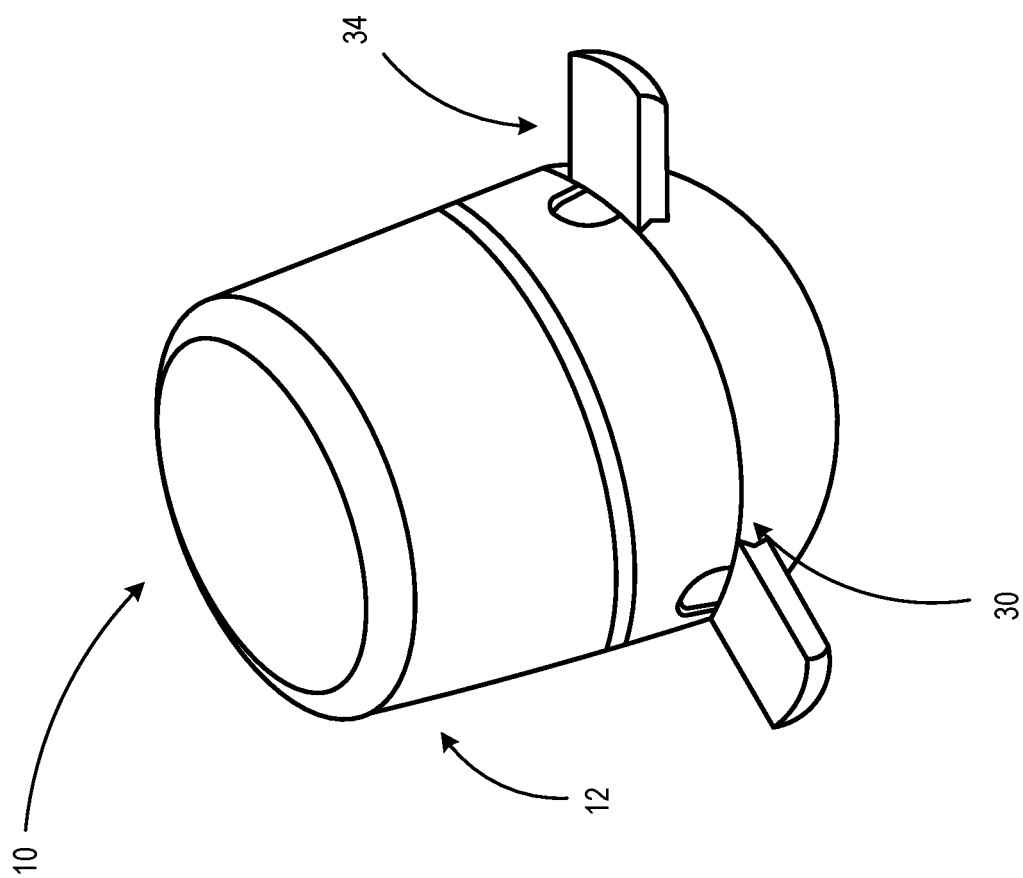
FIG. 4 is a view of the assembled interactive pet feeder.

An overall view of the assembled interactive feeder is shown in FIG. 4. As can be seen, the top portion 12 is configured to engage and mechanically connect to the bottom portion 30 which has flanges 34. Not seen in FIG. 4 are the plates 14, 20 and 22, which as noted above, can be rotated by the user to regulate the release of an animal treat.

While the present invention has been described herein with reference to various preferred embodiments, it will be understood that these embodiments are illustrative and that the scope of the invention is not so limited. Variations, modification, additions and improvements are possible and may fall within the scope of the disclosure as defined by the claims.

LISTING OF REFERENCE CHARACTERS 10 pet feeder device
12 top portion
13 cavity
14 plate
16 protruding portion
17 annular ring
18 opening
19 sloped surface
20 (upper) plate
21 perimeter rim
22 plate
24 holes
25 arrow
26 landing plate
27 arrow
28 opening
30 bottom portion
32 rounded portion
34 flange
40 high inflection region
42 low inflection region
α angle
CA central axis

What is claimed is:

1. A tiltable interactive pet feeder, comprising:
a top portion to contain one or more edible pet treats;
one or more rotatable plates, each including one or more holes;
a landing plate having one or more openings to dispense the one or more treats from the tiltable interactive pet feeder; and
a bottom portion;
wherein the one rotatable plate is mechanically engaged to the landing plate and rotatable relative to the landing plate, or the more rotatable plates are mechanically engaged to one another and the landing plate, and rotatable relative to one another and the landing plate;
wherein the top portion is directly mechanically engaged with the bottom portion;
wherein the tiltable interactive pet feeder has a central axis; and
wherein, when the tiltable interactive pet feeder is vertical, the one or more rotatable plates each has a sloping surface angled to promote movement of the one or more edible treats circumferentially around the central axis and towards the one or more holes.

2. The tiltable interactive pet feeder of claim 1, wherein the sloping surface is provided by an annular ring disposed around the central axis.

3. The tiltable interactive pet feeder of claim 2, wherein the sloping surface extends around the annular ring in a wave pattern.

4. The tiltable interactive pet feeder of claim 3, wherein the wave pattern has at least four inflection regions comprising at least two peak inflection regions and at least two trough inflection regions.

5. The tiltable interactive pet feeder of claim 4, wherein the sloping surface slopes downward from each of the at least two peak inflection regions towards each of the at least two trough inflection regions.

6. The tiltable interactive pet feeder of claim 5, wherein the one or more holes are disposed at the at least two trough inflection regions.

7. The tiltable interactive pet feeder of claim 1, wherein the sloping surface is angled at an acute angle relative to the central axis to promote movement of the one or more edible treats towards the central axis.

8. The tiltable interactive pet feeder of claim 1, wherein the bottom portion includes one or more protruding flanges.

9. The tiltable interactive pet feeder of claim 1, wherein the bottom portion includes a rounded portion to support the tiltable interactive pet feeder on a support surface.

10. The tiltable interactive pet feeder of claim 1, wherein the top portion, one or more rotatable plates, landing plate, and bottom portion, are made of thermoplastic.

11. The tiltable interactive pet feeder of claim 1, wherein the top portion is made of polycarbonate.

12. The tiltable interactive pet feeder of claim 1, wherein the one or more rotatable plates, landing plate and bottom portion are made of polypropylene.

13. The tiltable interactive pet feeder of claim 1, wherein the one or more rotatable plates comprises 1-6 plates.

14. The tiltable interactive pet feeder of claim 1, wherein the one or more rotatable plates each includes 1-6 holes.

15. A tiltable interactive pet feeder, comprising:
a top portion to contain one or more edible pet treats;
a plurality of rotatable plates, wherein the rotatable plates each includes 1-6 holes;
a landing plate having 1-5 openings to dispense the one or more treats from the tiltable interactive pet feeder;
a bottom portion including a rounded portion to support the tiltable interactive pet feeder on a support surface;
wherein the plurality of rotatable plates are mechanically engaged to one another, and rotatable relative to one another and the landing plate;
wherein the top portion is directly mechanically engaged to the bottom portion;
wherein the tiltable interactive pet feeder has a central axis; and
wherein, when the tiltable interactive pet feeder is vertical, the plurality of rotatable plates each has a sloping surface angled to promote movement of the one or more edible treats circumferentially around the central axis and towards the one or more holes.

16. The tiltable interactive pet feeder of claim 15, wherein the sloping surface is provided by an annular ring disposed around the central axis.

17. The tiltable interactive pet feeder of claim 16, wherein the sloping surface extends around the annular ring in a wave pattern.

18. The tiltable interactive pet feeder of claim 17, wherein the wave pattern has at least four inflection regions comprising at least two peak inflection regions and at least two trough inflection regions.

19. The tiltable interactive pet feeder of claim 18, wherein the sloping surface slopes downward from each of the at least two peak inflection regions towards each of the at least two trough inflection regions.

20. The tiltable interactive pet feeder of claim 19, wherein the one or more holes are disposed at the at least two trough inflection regions.

* * * * *